US008110941B2

(12) United States Patent  (10) Patent No.: US 8,110,941 B2
Boss et al.  (45) Date of Patent: Feb. 7, 2012

(54) POWER DEMAND MANAGEMENT METHOD AND SYSTEM

(75) Inventors: Gregory Jensen Boss, Saginaw, MI (US); Rick Allen Hamilton, II, Charlottesville, VA (US); Julianne Frances Haugh, Austin, TX (US); Anne R. Sand, Peyton, CO (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 12/392,137

(22) Filed: Feb. 25, 2009

(65) Prior Publication Data

US 2010/0213763 A1  Aug. 26, 2010

(51) Int. Cl.
*H02J 3/04* (2006.01)
(52) U.S. Cl. .......................................... 307/29
(58) Field of Classification Search .................. 307/18, 307/29, 64–66
See application file for complete search history.

(56) References Cited

U.S. PATENT DOCUMENTS

| | | | | |
|---|---|---|---|---|
| 4,152,656 A | * | 5/1979 | Udvardi-Lakos | 327/7 |
| 4,408,349 A | * | 10/1983 | Yukawa | 455/182.3 |
| 5,596,492 A | | 1/1997 | Divan et al. | |
| 5,670,833 A | * | 9/1997 | Mengelt et al. | 307/66 |
| 6,735,096 B2 | * | 5/2004 | Chang et al. | 363/37 |
| 7,142,950 B2 | * | 11/2006 | Rasmussen et al. | 700/286 |

FOREIGN PATENT DOCUMENTS

| | | |
|---|---|---|
| WO | WO8808218 | 10/1988 |
| WO | WO2008055499 | 5/2008 |

OTHER PUBLICATIONS

Soteriou et al.; Software-Directed Power-Aware Interconnection Networks; ACM Transactions on Architecture and Code Optimization, vol. 4, No. 1, Article 5, Publication Date: Mar. 2007; 40 pages.
Soteriou et al.; Software-Directed Power-Aware Interconnection Networks; CASES'05, Sep. 24-27, 2005, San Francisco, California, USA; pp. 274-285.

* cited by examiner

*Primary Examiner* — Albert W Paladini
(74) *Attorney, Agent, or Firm* — Schmeiser, Olsen & Watts; Anna Linne (57) ABSTRACT

A power demand modification method and system. The method includes detecting and monitoring by a computing system, a frequency signal associated with an input voltage signal used for powering a plurality of power consumption devices at a specified location. The computing system compares the frequency signal to a predetermined frequency value. The computing system determines that the frequency signal comprises a first value that is not equal to the predetermined frequency value. The computing system calculates a difference value between the first value and the predetermined frequency value. The computing system compares the difference value to a second value. The computing system enables a connection to an uninterruptable power supply (UPS) and performs a power demand modification process associated with the UPS. The computing system generates and stores a report associated with the load adjustment modification process.

20 Claims, 3 Drawing Sheets

POWER DEMAND MANAGEMENT METHOD AND SYSTEM

FIELD OF THE INVENTION

The present invention relates to a method and associated system for monitoring a frequency signal and performing a power demand modification process associated with an uninterruptable power supply based on a value of the frequency signal.

BACKGROUND OF THE INVENTION

Monitoring and modifying multiple power systems typically comprises an inaccurate process with little flexibility. Accordingly, there exists a need in the art to overcome at least some of the deficiencies and limitations described herein above.

SUMMARY OF THE INVENTION

The present invention provides a power demand modification method comprising:

detecting, by a computing system, a frequency signal from a power transmission grid, wherein said frequency signal is associated with an alternating current (AC) input voltage signal retrieved from said power transmission grid, and wherein said AC input voltage signal is used for powering a plurality of power consumption devices at a specified location;

monitoring, by said computing system, said frequency signal;

first comparing, by said computing system, said frequency signal to a predetermined frequency value;

determining, by said computing system based on said first comparing, that said frequency signal comprises a first value that is not equal to said predetermined frequency value;

calculating, by said computing system, a difference value between said first value and said predetermined frequency value;

second comparing, by said computing system, said difference value to a second value;

enabling, by said computing system, a connection to an uninterruptable power supply (UPS);

enabling, by said computing system based on results of said second comparing, a power demand modification process associated with said UPS;

generating, by said computing system a report associated with said power demand modification process; and storing, by said computing system, said report.

The present invention provides a computing system comprising a processor coupled to a computer-readable memory unit, said memory unit comprising instructions that when executed by the processor implements a power demand modification method, said method comprising:

detecting, by said computing system, a frequency signal from a power transmission grid, wherein said frequency signal is associated with an alternating current (AC) input voltage signal retrieved from said power transmission grid, and wherein said AC input voltage signal is used for powering a plurality of power consumption devices at a specified location;

monitoring, by said computing system, said frequency signal;

first comparing, by said computing system, said frequency signal to a predetermined frequency value;

determining, by said computing system based on said first comparing, that said frequency signal comprises a first value that is not equal to said predetermined frequency value;

calculating, by said computing system, a difference value between said first value and said predetermined frequency value;

second comparing, by said computing system, said difference value to a second value;

enabling, by said computing system, a connection to an uninterruptable power supply (UPS);

enabling, by said computing system based on results of said second comparing, a power demand modification process associated with said UPS;

generating, by said computing system a report associated with said power demand modification process; and storing, by said computing system, said report.

The present invention advantageously provides a simple method and associated system capable of monitoring and modifying multiple power systems.

DETAILED DESCRIPTION OF THE INVENTION

Figure 1:
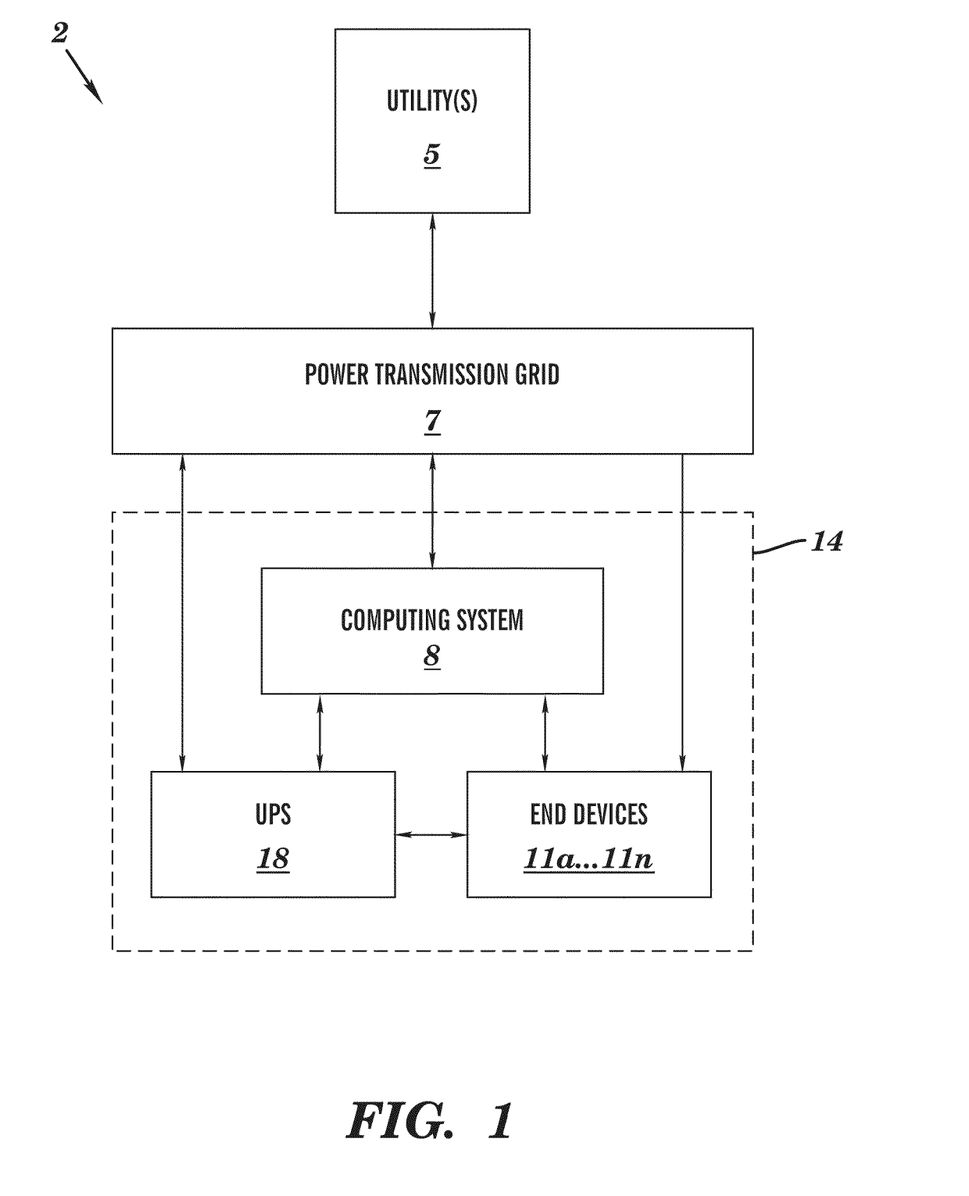
FIG. 1 illustrates a system for monitoring a frequency signal associated with a supply voltage retrieved from a power grid and performing a power demand modification process based on a value of the frequency signal, in accordance with embodiments of the present invention.

FIG. 1 illustrates a system 2 for monitoring a frequency signal associated with a supply voltage retrieved from a power grid and performing a power demand modification process based on a value of the frequency signal, in accordance with embodiments of the present invention. Load fluctuations associated with power usage by electrical devices (e.g., appliances such as a furnace turning on or off) or by power generation equipment may cause the frequency signal (e.g., 60 Hertz (Hz)) associated with a supply voltage retrieved from a power grid (e.g., power transmission grid 7) to fluctuate (e.g., rise or fall). Therefore, system 2 is enabled to monitor the frequency signal and perform a load modification process (i.e., with respect to power retrieved from power generation grid 7) based on a monitored value of the frequency signal. The load modification process is performed with respect to drawing power from and transmitting power to an uninterruptable power supply (UPS). A UPS (e.g., UPS 18 in FIG. 1) is defined herein as a power supply device that supplies power and is independent from the power grid. A UPS comprises stored power devices (e.g., batteries) or independent fuel powered devices (e.g., fuel cells (hydrogen, methanol, etc), generators, etc).

System 2 comprises a computing system 8 connected to a utility(s) 5 through a power transmission grid 7. Computing system 8 is additionally connected to end devices 11a ... 11n and UPS 18. Computing system 8, end devices 11a ... 11n, and UPS 18 may be located within a specified location 14. Specified location 14 may comprise a house and surrounding property, a building (associated with a business) and surrounding property, etc. End devices 11a . . . 11n may comprise any type of electrical device that consumes electrical power (e.g., household appliances, a furnace, an oven an air conditioner, a computer, a database/data storage, a hot water tank, an electric heater) provided by utility(s) 5. Electrical power may be retrieved via a power grid (e.g., power transmission grid 7). Utility 5 may comprise any type of electrical power supplier that produces and/or distributes electrical power. Utilities 5a . . . 5n may produce and/or distribute any type of electrical power including, inter alia, fossil fuel generated power, steam generated power, hydro generated power, solar generated power, wind generated power, fuel cell generated power, etc. Computing system 8 may comprise a memory system. The memory system may comprise a single memory system. Alternatively, the memory system may comprise a plurality of memory systems. The memory system may be internal to computing system 8 or external to computing system 8. Computing system 8 may comprise a software application for controlling functionality. Computing system 8 comprises system for monitoring a power grid (e.g., associated with power generated by utility(s) 5) frequency (e.g., 60 Hertz (Hz)) and activating UPS 18 to performs specific functions (e.g., retrieve power from power transmission grid, supply power to end devices 11a . . . 11n, etc) based on a value of the monitored frequency. Although system 2 is described with respect to monitoring a nominal frequency of 60 Hz (i.e., associated with power generated by utility(s) 5 and used in power generation in the United States), note that system 2 may be used to monitor any nominal frequency value. For example, system 2 may be used to monitor a nominal frequency value of 50 Hz (i.e., used in Europe, Africa, Asia, Australia, etc).

Large load or generation transients result in rapid changes in a power system frequency (e.g., frequency associated with utility(s) 5), which is immediately detectable throughout a power grid interconnect. For example, the loss of a significant power generating capacity (supply) results in a power system voltage and power system frequency falling below nominal values. Likewise, a loss of a significant load (demand), such as a transmission line to an urban area tripping due to accident, lighting strike, or failure of a power substation, results a power system voltage and frequency rising above a nominal value. The coupling of power system frequency and voltage is a result of rotating masses which are used to generate a majority of power. As a load increases, additional fuel must be provided to maintain the same power output. If additional fuel (e.g., in the form of steam or combustion) is not added, the rotation speed of the turbine or prime mover drops and the output frequency falls with it. As the load decreases, fuel must be reduced in the same manner.

System 2 monitors frequency changes in the grid (e.g., power transmission grid 7 of FIG. 1) and responds to deviations from a target frequency by activating UPS 18 to either:
1. Supply power to end devices 11a . . . 11n.
2. Consume energy to recharge a portion of a depleted battery (s) in UPS 18.

System 2 performs the following process:

When a frequency drop is detected and a load (i.e., on power transmission grid) must be decreased, UPS 18 may be enabled (by computing system 8 via a USB, interface, an Ethernet interface, a serial port interface, etc) to generate additional power for powering end devices (e.g., end devices 11a . . . 11n) (e.g., to discharge batteries internal to UPS 18). Conversely, when a frequency increase is detected, UPS 18 may be enabled to retrieve additional power from power transmission grid 7 (e.g., to recharge batteries internal to UPS 18). In extreme cases (e.g., a loss of a large portion of power generating capacity), the power system frequency (i.e., associated with grid power) falls outside the 60.000+/−0.035 Hz (or any other power generation frequency) dead-band used for most power generating systems. This results in further degradation of the power system as generators trip off-line due to their inability to function outside the dead-band. An amount of time for a response is measured in cycles (1/60th of a second) as a destructive interference between grid power and generator output may result in equipment damage. With communication delays measuring in seconds to minutes this time may not be sufficient to avert a catastrophe. Therefore, system 2 enables a function by which the further the system frequency deviates from the 60.000 Hz nominal value the more and potentially faster system 2 responds.

Computing system 8 comprises power control algorithms that receive inputs from a user to define thresholds associated with operate operating UPS 18. For example, the thresholds may comprise a power reserve percentage (i.e., in batteries comprised by UPS 18) and a maximum charge percentage allowed (i.e., in batteries comprised by UPS 18). If the power reserve percentage is 20% and the charge percentage allowed is 90% then computing system 8 will maintain UPS 18 at 90% capacity until a frequency change situation occurs on power transmission grid 7. If the grid frequency (i.e., for power transmission grid 7) increases past a specified threshold then UPS 18 will begin to charge it's batteries above the 90% mark. If the grid frequency decreases sufficiently then UPS 18 will begin draining its batteries by supplying necessary power to end devices 11a . . . 11n. UPS 18 will continue in that state until either the grid frequency returns to a target value or until the 20% threshold has been reached at which point UPS 18 will begin to demand power from power transmission grid 7 to maintain power to end devices 11a . . . 11n and charge its batteries.

The following examples describe implementation examples for monitoring a frequency signal and performing a power demand modification process based on a value of the frequency signal.

EXAMPLE 1

Example 1 describes a single-ended frequency responsive UPS (e.g., UPS 18 of FIG. 1). In this example, a 10 Kilowatt (KW) UPS with a 5 KW hour capacity is configured to generate supporting power starting at 59.95 HZ at 50% of capacity or a 5 KW output, increasing to 100% of capacity at 59.9 HZ. A standby battery threshold is set to a 100% state of charge and a cutout threshold is set to a 75% state of charge resulting in a difference equal to a 25% state of charge or 1.25 KW hours. Therefore, a maximum run-time at 50% output is 15 minutes and a maximum run-time at 100% output is 7.5 minutes. The following scenarios are described with respect to example 1.

Scenario 1

At 2:00 pm, a power transmission grid (e.g., power transmission grid 7) connected to a UPS (e.g., UPS 18) experiences a significant generator loss and a (grid interconnect) frequency falls to 59.9 Hz. The UPS immediately begins producing 100% of the required power. Downstream devices (e.g., end devices 11a . . . 11n) do not receive any notification that the UPS is operating on internal battery power. At 2:05 pm, the frequency has recovered to 59.925 Hz and power output is reduced to either 75% of the rated capacity or 100% of the required power. At 2:10 pm, the frequency has recovered to 59.95 Hz and the UPS output has declined to either 50% of rated capacity or 100% of required power. At 2:12 pm, the frequency has recovered to 60 Hz and the UPS discontinues producing power and begins recharging internal batteries according to the standard charge curve for the batteries in the UPS.

Scenario 2

At 3:00 pm, a power transmission grid (e.g., power transmission grid 7) connected to a UPS (e.g., UPS 18) experiences a lightning strike at a local substation, causing the substation to fail. The UPS immediately begins producing 100% of the required power. A notification is transmitted to downstream devices (e.g., end devices 11a . . . 11n) indicating that the UPS is operating on internal battery power. At 3:05 pm, the power is restored. However, as a result of power being restored, the grid frequency falls under the load of the consumers which are reconnected to the grid. After 5 minutes of operating at 100% of rated output, the current state of charge is 84% (10 KW*0.083 hours=0.833 KWH, 0.833 KWH consumed/5 KWH available=16%, leaving 84% remaining) which is above the 75% cutoff threshold. The frequency has only fallen to 59.95 Hz, so therefore the UPS continues to produce the less of 50% of rated power or 100% of required loads. At 3:07 pm, the frequency recovers above 59.95 Hz and the UPS terminates power production with 80% state of charge. A charging process for internal batteries in initiated.

EXAMPLE 2

Example 2 describes a double-ended frequency responsive UPS (e.g., UPS 18 of FIG. 1). In this example, a 10 KW UPS with a 5 KW hour capacity is configured to generate supporting power starting at 59.95 Hz at 50% of capacity or 5 KW output, increasing to 100% of capacity at 59.9 Hz. A standby battery threshold is set to 90% state of charge (this allows up to 0.5 KWH to be consumed to offset over-frequency events) and a cutout threshold is set to 75% state of charge resulting in a difference equal to a 15% state of charge or 0.75 KW hours. Therefore, a maximum run-time at 50% output is 9 minutes and a maximum run-time at 100% output is 4.5 minutes.

The following scenarios are described with respect to example 2.

Scenario 1

At 2:00 pm, a power transmission grid (e.g., power transmission grid 7) connected to a UPS (e.g., UPS 18) experiences a significant generator loss and the (grid interconnect) frequency falls to 59.9 Hz. The UPS immediately begins generating 100% of the required power. Downstream devices (e.g., end devices 11a . . . 11n) do not receive any notification that the UPS is operating on internal battery power. At 2:05 pm, a battery cutoff threshold has been reached and the UPS discontinues power production and begins recharging the internal batteries according to a standard charge curve. At 2:05 pm, the frequency had recovered to 59.92 KHz.

Scenario 2

At 3:00 pm, a power transmission grid (e.g., power transmission grid 7) connected to a UPS (e.g., UPS 18) experiences a lightning strike at a major substation causing the substation to fail resulting in a loss of load and therefore the frequency rises to 60.04 Hz. The UPS immediately begins increasing a state of charge from 90% using the highest available charging rate of 1 KW resulting in a state of charge increasing to 92%. At 3:05 pm, the power to the major substation is restored. However, as a result of power being restored, the frequency falls under the load of the consumers which are reconnected to the grid to 59.95 Hz. A current state of charge is 92% which is above the 75% cutoff threshold. The frequency has only fallen to 59.95 Hz so therefore the UPS begins to produce either 50% of rated power or 100% of required loads. At 3:07 pm, the frequency recovers above 59.95 Hz and the UPS terminates power production with an 88% state of charge. A charging process for internal batteries in initiated at a standard rate of charge.

The following steps illustrate a load adjustment modification process performed by system 2 based on a value of a monitored frequency signal on the power grid (e.g., from utility(s) 5):

1. If the monitored power grid frequency is plus or minus a dead-band value for the nominal line frequency (e.g., 60 Hz in North America and the Caribbean, 50 Hz in Europe, parts of Africa, Asia, and Australia, etc) it is determined if any load reductions or increases have been performed and system 2 returns to a normal operating mode. No load reductions or increases are necessary determine if either a maintenance charge process (i.e., with respect to batteries within a UPS) or a maintenance discharge process (i.e., with respect to batteries within the UPS) are necessary in order to maintain battery health and a life expectancy for the batteries.
2. If the monitored power grid frequency is greater than the nominal frequency by more the dead-band amount, power consumption is increased by reducing an amount of power being supported or by scheduling a maintenance cycle or a charge cycle for the batteries.
3. If the monitored power grid frequency is less than the nominal frequency by more than the dead-band amount, power consumption is decreased by increasing the amount of power being supported or by scheduling a maintenance cycle or a discharge cycle for the batteries.
4. System 2 delays for a specified time period step 1 is repeated.

The following steps detail step 2 (i.e., reduce power demand) of the above described steps as follows:

A. Computing system 8 determines an amount of power reduction necessary and compares the amount of power reduction to an existing battery state of charge and existing power support. If the power reduction is optional (e.g., not a blackout) and the battery state of charge is at or below a configured minimum safe value, this step is bypassed.
B. If system 2 is currently operating on battery power (i.e., from UPS 8), a DC to AC conversion rate is increased by partially supporting the load (e.g., during a brownout) or by computing a duty cycle that allows a DC to AC conversion process to provide a percentage of total power over a longer time period such that the power demand is reduced.
C. If system 2 is currently operating on line (i.e., AC provided by via power transmission grid 7) power, a DC to AC conversion rate is reduced for any running charge cycles or loads are supported by increasing a DC to AC conversion.

The following steps detail step 3 (i.e., increase power demand) of the above described steps as follows:

A. Computing system 8 determines an amount of power increase necessary and compares to an existing battery state of charge and existing power support. If a power increase exceeds an available storage capacity, this step is bypassed.
B. If system 2 is currently operating on battery power (i.e., from UPS 8) a DC to AC conversion rate is decreased by reducing a partial support of a load or by changing a duty cycle of the DC to AC conversion process such that the power demand is increased.
C. If system 2 is currently operating on line (i.e., AC provided by via power transmission grid 7) power, a DC to AC conversion rate is increased for any running charge cycles or by reducing a load support by decreasing a DC to AC conversion rate.

The following steps detail a maintenance charge process for charging batteries internal to UPS 18:
1. Computing system 8 determines if a maintenance charge is required by comparing an available capacity of a battery bank (i.e., within UPS) with a maximum capacity of the battery bank.
2. Computing system 8 initiates appropriate charge cycles to bring the battery bank capacity to 100%.

The following steps detail a maintenance discharge process for charging batteries internal to UPS 18:
1. Computing system 8 determines if a maintenance discharge is required in order to provide additional storage capacity for an increase power demand process.
2. Computing system 8 initiate a discharge cycle by performing DC to AC conversion to lower a battery capacity to a configured amount such that additional storage capacity is available for the increase power demand process.

Figure 2:
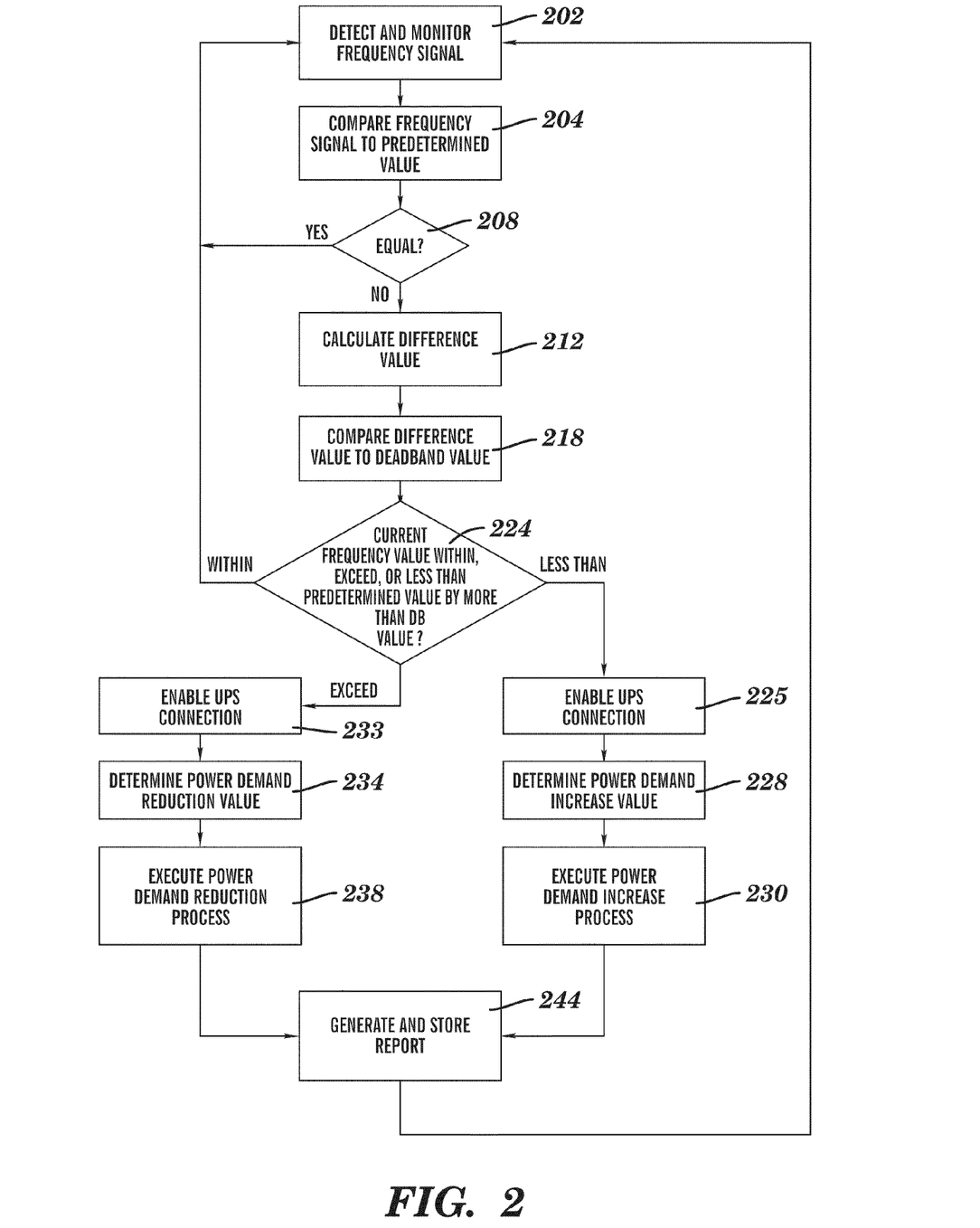
FIG. 2 illustrates a flowchart describing an algorithm used by the system of FIG. 1 for monitoring a frequency signal associated with a supply voltage retrieved from a power grid and performing a power demand modification process based on a value of the frequency signal, in accordance with embodiments of the present invention.

FIG. 2 illustrates a flowchart describing an algorithm used by system 2 of FIG. 1 for monitoring a frequency signal associated with a supply voltage retrieved from a power grid (e.g., power transmission grid 7 in FIG. 1) and performing a power demand modification process based on a value of the frequency signal, in accordance with embodiments of the present invention. In step 202, a computing system (e.g., computing system 8 of FIG. 1) detects and monitors a frequency signal associated with an input AC voltage signal (i.e., from a utility (e.g., utility(s) 5 of FIG. 1) via a power grid) used for powering a plurality of power consumption devices (e.g., end devices 11a . . . 11n of FIG. 1) at a specified location (e.g., specified location 14 of FIG. 1). In step 204, the computing system compares the frequency signal to a predetermined frequency value (i.e., the expected frequency value). For example, the predetermined frequency value may comprise, inter alia, 60 Hz, 50 Hz, etc. In step 208, the computing system determines (i.e., based on results generated in step 204) if the frequency signal comprises a current frequency value is equal to the predetermined frequency value. If in step 208, it is determined that the frequency signal comprises a current frequency value equal to the predetermined frequency value then step 202 is repeated. If in step 208, it is determined that the frequency signal comprises a current frequency value that is not equal to the predetermined frequency value then in step 212, the computing system calculates a difference value between said current frequency value and the predetermined frequency value. In step 218, the computing system compares the difference value to a dead-band value. The dead-band value comprises an acceptable offset (i.e., for the current frequency value) from the predetermined frequency value. In step 224, (i.e., based on results from step 218), it is determined if the current frequency value is within the dead-band value range of the predetermined frequency or exceeds or is less than the predetermined frequency value by more than the dead-band value.

If in step 224, it is determined that the current frequency value is within the dead-band value range of the predetermined frequency then step 202 is repeated.

If in step 224, it is determined that the current frequency value exceeds the predetermined frequency value by more than the dead-band value then in step 233, the computing system enables a connection to a UPS (e.g., UPS 18 in FIG. 1). In step 234, the computing system determines a power demand reduction value. In step 238, the computing system executes a power demand reduction process. The following three scenarios illustrate various methods for implementing the power demand reduction process of step 238.

Scenario 1
1. The computing system monitors a current charge state value of a first battery in a UPS.
2. The computing system analyzes a current charge state value of the first battery with respect to the power reduction value (i.e., determined in step 234).
3. The computing system (in response to results of the analyzing) compares the current charge state value of the first battery to a predetermined charge state value.
4. The computing system determines that the first battery requires a specified charge for a specified time period.
5. The computing system enables a connection between the UPS and the power transmission grid such that the input AC voltage signal is connected to the UPS. The UPS converts the input AC voltage signal into a DC signal and the DC signal is connected to the first battery such that the first battery obtains a full charge.
6. The computing system disables (after the specified time period) the connection between the UPS and the power transmission grid.
7. The process of scenario 1 may be repeated multiple times for additional batteries in the UPS if the power demand has not been sufficiently reduced.

Scenario 2
1. The computing system transmits a command (i.e., to a UPS) for converting a DC voltage signal (i.e., generated by the UPS) into an additional AC voltage signal.
2. The computing system enables a connection between the UPS and the plurality of power consumption devices such that the plurality of power consumption devices are additionally being powered by the additional AC signal thereby reducing a power demand on the input AC voltage signal.
3. The computing system determines that the power reduction value has been reached.
4. The computing system disables connection between the UPS and the plurality of power consumption devices such that the plurality of power consumption devices are only being powered by input AC voltage signal.

Scenario 3
1. The computing system transmits a command for converting a direct current (DC) voltage signal being generated by the UPS into additional AC voltage signal. In this scenario, the UPS comprises a fuel cell (e.g., hydrogen, methanol, etc) instead of batteries.
2. The computing system enables a connection between the UPS and the plurality of power consumption devices such that the plurality of power consumption devices are additionally being powered by the additional AC signal being generated by the UPS thereby reducing a power demand on the AC input voltage signal.
3. The computing system determines that the power reduction value has been reached.
4. The computing system disables the connection between the UPS and the plurality of power consumption devices such that the plurality of power consumption devices are being powered by (only) the input AC voltage signal.

In step 244, a report indicating results of any of the aforementioned three scenarios is generated and stored and step 202 is repeated.

If in step 224, it is determined that the current frequency value is less than the predetermined frequency value by more than the dead-band value then in step 225, the computing system enables a connection to a UPS (e.g., UPS 18 in FIG. 1). In step 228, the computing system determines a power demand increase value. In step 230, the computing system executes a power demand increase process. The following three scenarios illustrate various methods for implementing the power demand increase process of step 230.

Scenario 1

1. The computing system monitors a current charge state value of a first battery in a UPS.
2. The computing system analyzes a current charge state value of the first battery with respect to the power increase value (i.e., determined in step 228).
3. The computing system (in response to results of the analyzing) compares the current charge state value of the first battery to a predetermined charge state value.
4. The computing system determines (i.e., based on results of step 3) that the current charge state value of the first battery is greater than the predetermined charge state value.
4. The computing system enables a connection between the UPS and the plurality of power consumption devices such that the plurality of power consumption devices discharge the first battery.
5. The computing system disables (i.e., after the first battery has been discharged) the connection between the UPS and the plurality of power consumption devices.
6. The process of scenario 1 may be repeated multiple times for additional batteries in the UPS if the power demand has not been sufficiently increased.

Scenario 2

In scenario 2, the plurality of power consumption devices are being partially powered by the input AC voltage signal and partially powered by an additional AC voltage signal generated by a UPS.

1. The computing system disables a connection between the additional AC voltage signal and the plurality of power consumption devices.
2. The computing system transmits (to the UPS) a command for throttling the additional AC voltage signal such that a modified additional AC voltage signal is generated. The modified additional AC voltage signal is less than the additional AC voltage signal.
3. The computing system enables a connection between the modified additional AC voltage signal and the plurality of power consumption devices such that the plurality of power consumption devices are partially being powered by the modified additional AC voltage signal thereby increasing a power demand on the input AC voltage signal.
4. The computing system determines that the desired power demand increase value has been reached.
5. The computing system disables the connection between the modified additional AC voltage signal and the plurality of power consumption devices such that the plurality of power consumption devices are being powered (only) by the input AC voltage signal.

Scenario 3

In scenario 3, the plurality of power consumption devices are being partially powered by the input AC voltage signal and partially powered by an additional AC voltage signal generated by a UPS. In this scenario, the UPS comprises a fuel cell (e.g., hydrogen, methanol, etc) instead of batteries.

1. The computing system disables a connection between the additional AC voltage signal and the plurality of power consumption devices.
2. The computing system transmits (to the UPS) a command for reducing a fuel flow to the fuel (e.g., hydrogen, methanol, etc) cell thereby throttling the additional AC voltage signal such that a modified additional AC voltage signal is generated. The modified additional AC voltage signal is less than the additional AC voltage signal.
3. The computing system enables a connection between the modified additional AC voltage signal and the plurality of power consumption devices such that the plurality of power consumption devices are partially being powered by the modified additional AC voltage signal thereby increasing a power demand on the input AC voltage signal.
4. The computing system determines that the power demand increase value has been reached.
5. The computing system disables the connection between the modified additional AC voltage signal and the plurality of power consumption devices such that the plurality of power consumption devices are (only) being powered by the input AC voltage signal.

In step 244, a report indicating results of any of the aforementioned three scenarios is generated and stored and step 202 is repeated.

Figure 3:
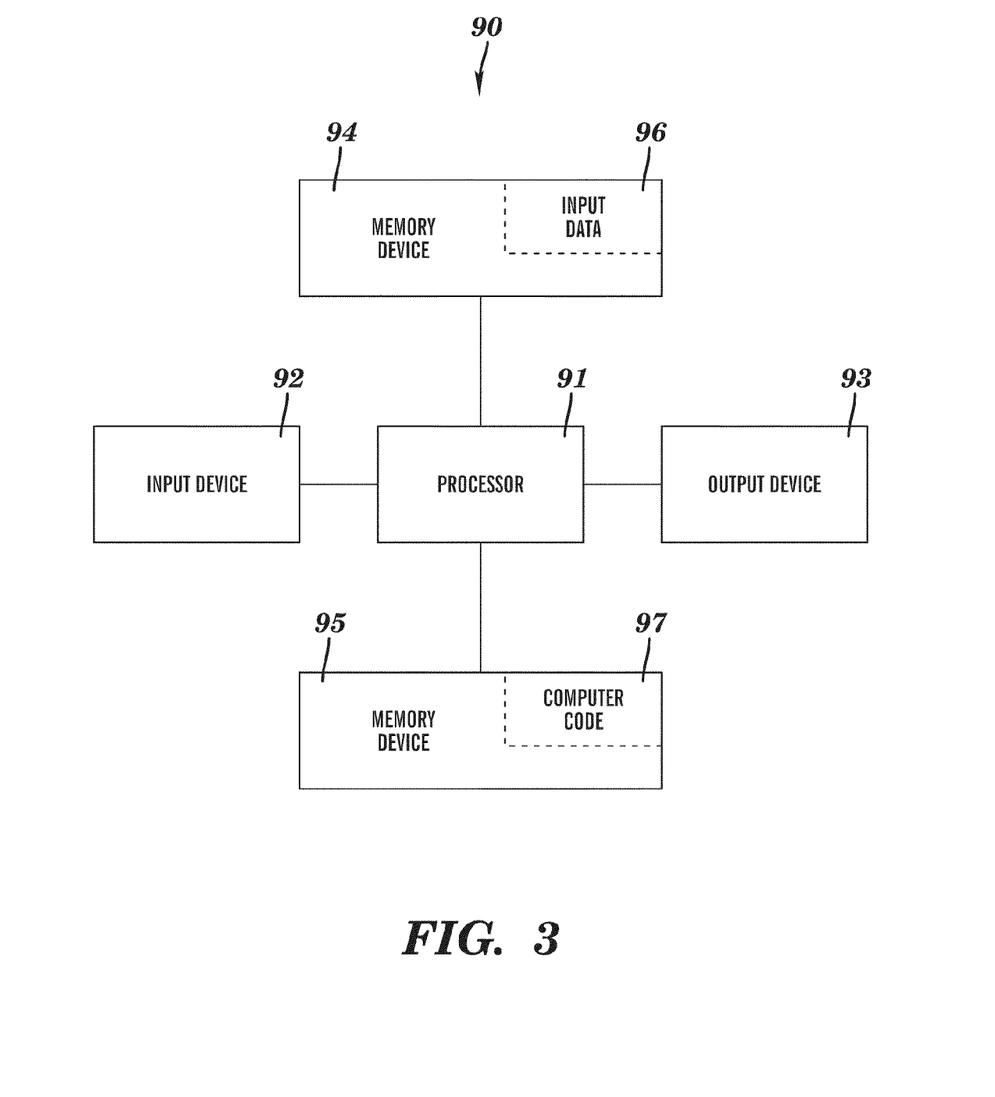
FIG. 3 illustrates a computer apparatus used for monitoring a frequency signal associated with a supply voltage retrieved from a power grid and performing a power demand modification process based on a value of the frequency signal, in accordance with embodiments of the present invention.

FIG. 3 illustrates a computer apparatus 90 (e.g., computing system 8 of FIG. 1) used for monitoring a frequency signal associated with a supply voltage retrieved from a power grid and performing a power demand modification process based on a value of the frequency signal, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 2) for monitoring a frequency signal associated with a supply voltage retrieved from a power grid and performing a power demand modification process based on a value of the frequency signal. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 3) may comprise the algorithm of FIG. 2 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Still yet, any of the components of the present invention could be created, integrated, hosted, maintained, deployed, managed, serviced, etc. by a service supplier who offers to for monitor a frequency signal associated with a supply voltage retrieved from a power grid and perform a power demand modification process based on a value of the frequency signal. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for monitoring a frequency signal associated with a supply voltage retrieved from a power grid and performing a power demand modification process based on a value of the frequency signal. In another embodiment, the invention provides a business method that performs the process steps of the invention on a subscription, advertising, and/or fee basis. That is, a service supplier, such as a Solution Integrator, could offer to monitor a frequency signal associated with a supply voltage retrieved from a power grid and perform a power demand modification process based on a value of the frequency signal. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties. Additionally, the service supplier may manage (i.e., receive, collect, etc) financial services provided by an electric utility for providing or receiving power from/to system 2 of FIG. 1.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A power demand modification method comprising:
receiving, by a computing system, a frequency signal value from a power transmission grid, wherein said frequency signal value is associated with a frequency signal associated with an alternating current (AC) input voltage signal retrieved from said power transmission grid, and wherein said AC input voltage signal is used for powering a plurality of power consumption devices at a specified location;
monitoring, by said computing system, said frequency signal value;
first comparing, by said computing system, said frequency signal value to a predetermined frequency value;
determining, by said computing system based on said first comparing, that said frequency signal value comprises a first value that is not equal to said predetermined frequency value;
calculating, by said computing system, a difference value between said first value and said predetermined frequency value;
second comparing, by said computing system, said difference value to a second value, wherein said second value comprises a frequency offset value;
enabling, by said computing system, a connection to an uninterruptable power supply (UPS);
enabling, by said computing system based on results of said second comparing, a power demand modification process associated with using said UPS to modify a power demand on said AC input voltage signal;
generating, by said computing system a report associated with said power demand modification process; and
storing, by said computing system, said report.

2. The method of claim 1, wherein said results of said second comparing indicates that said first value exceeds said predetermined value by more than said second value, and wherein said power demand modification process comprises:
determining, by said computing system, a desired power demand reduction value associated with reducing said first value by a specified amount;
monitoring, by said computing system, a current charge state value of a first battery in said UPS;
first analyzing, by said computing system, said current charge state value of said first battery with respect to said desired power reduction value;
comparing, by said computing system in response to results of said first analyzing, said current charge state value of said first battery to a predetermined charge state value;
determining, by said computing system based on results of said comparing said current charge state value of said first battery to said predetermined charge state value, that said first battery requires a first specified charge for a first specified time period;
enabling, by said computing system, a first connection between said UPS and said power transmission grid such that said AC input voltage signal is connected to said UPS, wherein said UPS converts said AC input voltage signal into a first direct current (DC) signal, wherein said first DC signal is connected to said first battery, and wherein said first battery obtains a full charge; and
disabling, by said computing system after said specified time period, said first connection between said UPS and said power transmission grid.

3. The method of claim 2, wherein said power demand modification process further comprises:
determining, by said computing system, that said first value has not been reduced by said specified amount;
monitoring, by said computing system, a current charge state value of a second battery in said UPS;
second analyzing, by said computing system, said current charge state value of said second battery with respect to said desired power demand reduction value;
comparing by said computing system in response to results of said second analyzing, said current charge state value of said second battery to said predetermined charge state value;
determining, by said computing system based on results of said comparing said current charge state value of said second battery to said predetermined charge state value, that said second battery requires a second specified charge for a second specified time period;
enabling, by said computing system, a second connection between said UPS and said power transmission grid such that said AC input voltage signal is connected to said UPS, wherein said UPS converts said AC input voltage signal into a second DC signal, wherein said second DC signal is connected to said second battery, and wherein said second battery obtains a full charge; and
disabling, by said computing system after second specified time period, said second connection between said UPS and said power transmission grid.

4. The method of claim 1, wherein said results of said second comparing indicates that said first value exceeds said predetermined value by more than said second value, wherein said plurality of power consumption devices are being powered by said AC input voltage signal, and wherein said power demand modification process comprises:
determining, by said computing system, a desired power demand reduction value associated with reducing said first value by a specified amount;

transmitting, by said computing system to said UPS, a command for converting a direct current (DC) voltage signal into an additional AC voltage signal;
enabling, by said computing system, a connection between said UPS and said plurality of power consumption devices such that said plurality of power consumption devices are additionally being powered by said additional AC signal being generated by said UPS thereby reducing said power demand on said AC input voltage signal;
determining, by said computing system, that said desired power reduction value has been reached; and
disabling, by said computing system, said connection between said UPS and said plurality of power consumption devices such that said plurality of power consumption devices are only being powered by said AC input voltage signal.

5. The method of claim 1, wherein said results of said second comparing indicates that said first value is less than said predetermined value by more than said second value, and wherein said power demand modification process comprises:
determining, by said computing system, a desired power demand increase value associated with increasing said first value by a specified amount;
monitoring, by said computing system, a current charge state value of a first battery in said UPS;
first analyzing, by said computing system, said current charge state value of said first battery with respect to said desired power demand increase value;
comparing, by said computing system in response to results of said first analyzing, said current charge state value of said first battery to a predetermined charge state value;
determining, by said computing system based on results of said comparing said current charge state value of said first battery to said predetermined charge state value, that said current charge state value of said first battery is greater than said predetermined charge state value; and
enabling, by said computing system, a first connection between said UPS and said plurality of power consumption devices such that said plurality of power consumption devices discharge said first battery within said UPS; and
disabling, by said computing system after said first battery has been discharged, said first connection between said UPS and said plurality of power consumption devices.

6. The method of claim 5, wherein said power demand modification process further comprises:
determining, by said computing system, that said first value has not been increased by said specified amount;
monitoring, by said computing system, a current charge state value of a second battery in said UPS;
second analyzing, by said computing system, said current charge state value of said second battery with respect to said desired power demand increase value;
comparing by said computing system in response to results of said second analyzing, said current charge state value of said second battery to said predetermined charge state value;
determining, by said computing system based on results of said comparing said current charge state value of said second battery to said predetermined charge state value, that said current charge state value of said second battery is greater than said predetermined charge state value;
enabling, by said computing system, a second connection between said UPS and said plurality of power consumption devices such that said plurality of power consumption devices discharge said second battery within said UPS; and
disabling, by said computing system after said second battery has been discharged, said second connection between said UPS and said plurality of power consumption devices.

7. The method of claim 1, wherein said results of said second comparing indicates that said first value is less than said predetermined value by more than said second value, wherein said plurality of power consumption devices are being partially powered by said AC input voltage signal and partially powered by an additional AC voltage signal generated by said UPS, and wherein said power demand modification process comprises:
determining, by said computing system, a desired power demand increase value associated with increasing said first value by a specified amount;
disabling, by said computing system, a first connection between said additional AC voltage signal and said plurality of power consumption devices;
transmitting, by said computing system to said UPS, a command for throttling said additional AC voltage signal such that a modified additional AC voltage signal is generated, wherein said modified additional AC voltage signal is less than said additional AC voltage signal;
enabling, by said computing system, a second connection between said modified additional AC voltage signal and said plurality of power consumption devices such that said plurality of power consumption devices are partially being powered by said modified additional AC voltage signal thereby increasing said power demand on said AC input voltage signal;
determining, by said computing system, that said desired power demand increase value has been reached; and
disabling, by said computing system, said second connection between said modified additional AC voltage signal and said plurality of power consumption devices such that said plurality of power consumption devices are only being powered by said AC input voltage signal.

8. The method of claim 1, wherein said UPS comprises a fuel cell, wherein said results of said second comparing indicates that said first value exceeds said predetermined value by more than said second value, wherein said plurality of power consumption devices are being powered by said AC input voltage signal, and wherein said power demand modification process comprises:
determining, by said computing system, a desired power demand reduction value associated with reducing said first value by a specified amount;
transmitting, by said computing system to said UPS, a command for converting a direct current (DC) voltage signal being generated by said hydrogen fuel cell into an additional AC voltage signal;
enabling, by said computing system, a connection between said UPS and said plurality of power consumption devices such that said plurality of power consumption devices are additionally being powered by said additional AC signal being generated by said UPS thereby reducing said power demand on said AC input voltage signal;
determining, by said computing system, that said desired power reduction value has been reached; and
disabling, by said computing system, said connection between said UPS and said plurality of power consumption devices such that said plurality of power consumption devices are only being powered by said AC input voltage signal.

9. The method of claim 1, wherein said UPS comprises a fuel cell, wherein said results of said second comparing indicates that said first value is less than said predetermined value by more than said second value, wherein said plurality of power consumption devices are being partially powered by said AC input voltage signal and partially powered by an additional AC voltage signal generated by said UPS, and wherein said power demand modification process comprises:
determining, by said computing system, a desired power demand increase value associated with increasing said first value by a specified amount;
disabling, by said computing system, a first connection between said additional AC voltage signal and said plurality of power consumption devices;
transmitting, by said computing system to said UPS, a command for reducing a fuel flow to said hydrogen fuel cell thereby throttling said additional AC voltage signal such that a modified additional AC voltage signal is generated, wherein said modified additional AC voltage signal is less than said additional AC voltage signal;
enabling, by said computing system, a second connection between said modified additional AC voltage signal and said plurality of power consumption devices such that said plurality of power consumption devices are partially being powered by said modified additional AC voltage signal thereby increasing said power demand on said AC input voltage signal;
determining, by said computing system, that said desired power demand increase value has been reached; and
disabling, by said computing system, said second connection between said modified additional AC voltage signal and said plurality of power consumption devices such that said plurality of power consumption devices are only being powered by said AC input voltage signal.

10. A computer program product, comprising a computer storage medium comprising a computer readable program code embodied therein, said computer readable program code configured to perform the method of claim 1 upon being executed by a processor of said computing system.

11. A process for supporting computer infrastructure, said process comprising providing at least one support service for at least one of creating, integrating, hosting, maintaining, and deploying computer-readable code in a computing system, wherein the code in combination with the computing system is capable of performing the method of claim 1.

12. A computing system comprising a processor coupled to a computer-readable memory unit, said memory unit comprising instructions that when executed by the processor implements a power demand modification method, said method comprising:
receiving, by said computing system, a frequency signal value from a power transmission grid, wherein said frequency signal value is associated with a frequency signal associated with an alternating current (AC) input voltage signal retrieved from said power transmission grid, and wherein said AC input voltage signal is used for powering a plurality of power consumption devices at a specified location;
monitoring, by said computing system, said frequency signal value;
first comparing, by said computing system, said frequency signal value to a predetermined frequency value;
determining, by said computing system based on said first comparing, that said frequency signal value comprises a first value that is not equal to said predetermined frequency value;
calculating, by said computing system, a difference value between said first value and said predetermined frequency value;
second comparing, by said computing system, said difference value to a second value, wherein said second value comprises a frequency offset value;
enabling, by said computing system, a connection to an uninterruptable power supply (UPS);
enabling, by said computing system based on results of said second comparing, a power demand modification process associated with using said UPS to modify a power demand on said AC input voltage signal;
generating, by said computing system a report associated with said load adjustment modification process; and
storing, by said computing system, said report.

13. The computing system of claim 12, wherein said results of said second comparing indicates that said first value exceeds said predetermined value by more than said second value, and wherein said power demand modification process comprises:
determining, by said computing system, a desired power demand reduction value associated with reducing said first value by a specified amount;
monitoring, by said computing system, a current charge state value of a first battery in said UPS;
first analyzing, by said computing system, said current charge state value of said first battery with respect to said desired power reduction value;
comparing, by said computing system in response to results of said first analyzing, said current charge state value of said first battery to a predetermined charge state value;
determining, by said computing system based on results of said comparing said current charge state value of said first battery to said predetermined charge state value, that said first battery requires a first specified charge for a first specified time period;
enabling, by said computing system, a first connection between said UPS and said power transmission grid such that said AC input voltage signal is connected to said UPS, wherein said UPS converts said AC input voltage signal into a first direct current (DC) signal, wherein said first DC signal is connected to said first battery, and wherein said first battery obtains a full charge; and
disabling, by said computing system after said specified time period, said first connection between said UPS and said power transmission grid.

14. The computing system of claim 13, wherein said power demand modification process further comprises:
determining, by said computing system, that said first value has not been reduced by said specified amount;
monitoring, by said computing system, a current charge state value of a second battery in said UPS;
second analyzing, by said computing system, said current charge state value of said second battery with respect to said desired power demand reduction value;
comparing by said computing system in response to results of said second analyzing, said current charge state value of said second battery to said predetermined charge state value;
determining, by said computing system based on results of said comparing said current charge state value of said second battery to said predetermined charge state value, that said second battery requires a second specified charge for a second specified time period;

enabling, by said computing system, a second connection between said UPS and said power transmission grid such that said AC input voltage signal is connected to said UPS, wherein said UPS converts said AC input voltage signal into a second DC signal, wherein said second DC signal is connected to said second battery, and wherein said second battery obtains a full charge; and disabling, by said computing system after second specified time period, said second connection between said UPS and said power transmission grid.

15. The computing system of claim 12, wherein said results of said second comparing indicates that said first value exceeds said predetermined value by more than said second value, wherein said plurality of power consumption devices are being powered by said AC input voltage signal, and wherein said power demand modification process comprises:

determining, by said computing system, a desired power demand reduction value associated with reducing said first value by a specified amount;

transmitting, by said computing system to said UPS, a command for converting a direct current (DC) voltage signal into an additional AC voltage signal;

enabling, by said computing system, a connection between said UPS and said plurality of power consumption devices such that said plurality of power consumption devices are additionally being powered by said additional AC signal being generated by said UPS thereby reducing said power demand on said AC input voltage signal;

determining, by said computing system, that said desired power reduction value has been reached; and disabling, by said computing system, said connection between said UPS and said plurality of power consumption devices such that said plurality of power consumption devices are only being powered by said AC input voltage signal.

16. The computing system of claim 12, wherein said results of said second comparing indicates that said first value is less than said predetermined value by more than said second value, and wherein said power demand modification process comprises:

determining, by said computing system, a desired power demand increase value associated with increasing said first value by a specified amount;

monitoring, by said computing system, a current charge state value of a first battery in said UPS;

first analyzing, by said computing system, said current charge state value of said first battery with respect to said desired power demand increase value;

comparing, by said computing system in response to results of said first analyzing, said current charge state value of said first battery to a predetermined charge state value;

determining, by said computing system based on results of said comparing said current charge state value of said first battery to said predetermined charge state value, that said current charge state value of said first battery is greater than said predetermined charge state value; and enabling, by said computing system, a first connection between said UPS and said plurality of power consumption devices such that said plurality of power consumption devices discharge said first battery within said UPS; and disabling, by said computing system after said first battery has been discharged, said first connection between said UPS and said plurality of power consumption devices.

17. The computing system of claim 16, wherein said power demand modification process further comprises:

determining, by said computing system, that said first value has not been increased by said specified amount;

monitoring, by said computing system, a current charge state value of a second battery in said UPS;

second analyzing, by said computing system, said current charge state value of said second battery with respect to said desired power demand increase value;

comparing by said computing system in response to results of said second analyzing, said current charge state value of said second battery to said predetermined charge state value;

determining, by said computing system based on results of said comparing said current charge state value of said second battery to said predetermined charge state value, that said current charge state value of said second battery is greater than said predetermined charge state value;

enabling, by said computing system, a second connection between said UPS and said plurality of power consumption devices such that said plurality of power consumption devices discharge said second battery within said UPS; and disabling, by said computing system after said second battery has been discharged, said second connection between said UPS and said plurality of power consumption devices.

18. The computing system of claim 12, wherein said results of said second comparing indicates that said first value is less than said predetermined value by more than said second value, wherein said plurality of power consumption devices are being partially powered by said AC input voltage signal and partially powered by an additional AC voltage signal generated by said UPS, and wherein said power demand modification process comprises:

determining, by said computing system, a desired power demand increase value associated with increasing said first value by a specified amount;

disabling, by said computing system, a first connection between said additional AC voltage signal and said plurality of power consumption devices;

transmitting, by said computing system to said UPS, a command for throttling said additional AC voltage signal such that a modified additional AC voltage signal is generated, wherein said modified additional AC voltage signal is less than said additional AC voltage signal;

enabling, by said computing system, a second connection between said modified additional AC voltage signal and said plurality of power consumption devices such that said plurality of power consumption devices are partially being powered by said modified additional AC voltage signal thereby increasing said power demand on said AC input voltage signal;

determining, by said computing system, that said desired power demand increase value has been reached; and disabling, by said computing system, said second connection between said modified additional AC voltage signal and said plurality of power consumption devices such that said plurality of power consumption devices are only being powered by said AC input voltage signal.

19. The computing system of claim 12, wherein said UPS comprises a fuel cell, wherein said results of said second comparing indicates that said first value exceeds said predetermined value by more than said second value, wherein said plurality of power consumption devices are being powered by said AC input voltage signal, and wherein said power demand modification process comprises:
- determining, by said computing system, a desired power demand reduction value associated with reducing said first value by a specified amount;
- transmitting, by said computing system to said UPS, a command for converting a direct current (DC) voltage signal being generated by said hydrogen fuel cell into an additional AC voltage signal;
- enabling, by said computing system, a connection between said UPS and said plurality of power consumption devices such that said plurality of power consumption devices are additionally being powered by said additional AC signal being generated by said UPS thereby reducing said power demand on said AC input voltage signal;
- determining, by said computing system, that said desired power reduction value has been reached; and
- disabling, by said computing system, said connection between said UPS and said plurality of power consumption devices such that said plurality of power consumption devices are only being powered by said AC input voltage signal.

20. The computing system of claim 12, wherein said UPS comprises a fuel cell, wherein said results of said second comparing indicates that said first value is less than said predetermined value by more than said second value, wherein said plurality of power consumption devices are being partially powered by said AC input voltage signal and partially powered by an additional AC voltage signal generated by said UPS, and wherein said power demand modification process comprises:
- determining, by said computing system, a desired power demand increase value associated with increasing said first value by a specified amount;
- disabling, by said computing system, a first connection between said additional AC voltage signal and said plurality of power consumption devices;
- transmitting, by said computing system to said UPS, a command for reducing a fuel flow to said hydrogen fuel cell thereby throttling said additional AC voltage signal such that a modified additional AC voltage signal is generated, wherein said modified additional AC voltage signal is less than said additional AC voltage signal;
- enabling, by said computing system, a second connection between said modified additional AC voltage signal and said plurality of power consumption devices such that said plurality of power consumption devices are partially being powered by said modified additional AC voltage signal thereby increasing said power demand on said AC input voltage signal;
- determining, by said computing system, that said desired power demand increase value has been reached; and
- disabling, by said computing system, said second connection between said modified additional AC voltage signal and said plurality of power consumption devices such that said plurality of power consumption devices are only being powered by said AC input voltage signal.

* * * * *